Nov. 15, 1949     R. J. OLANDER     2,488,026
DOOR FASTENER
Filed Jan. 20, 1945
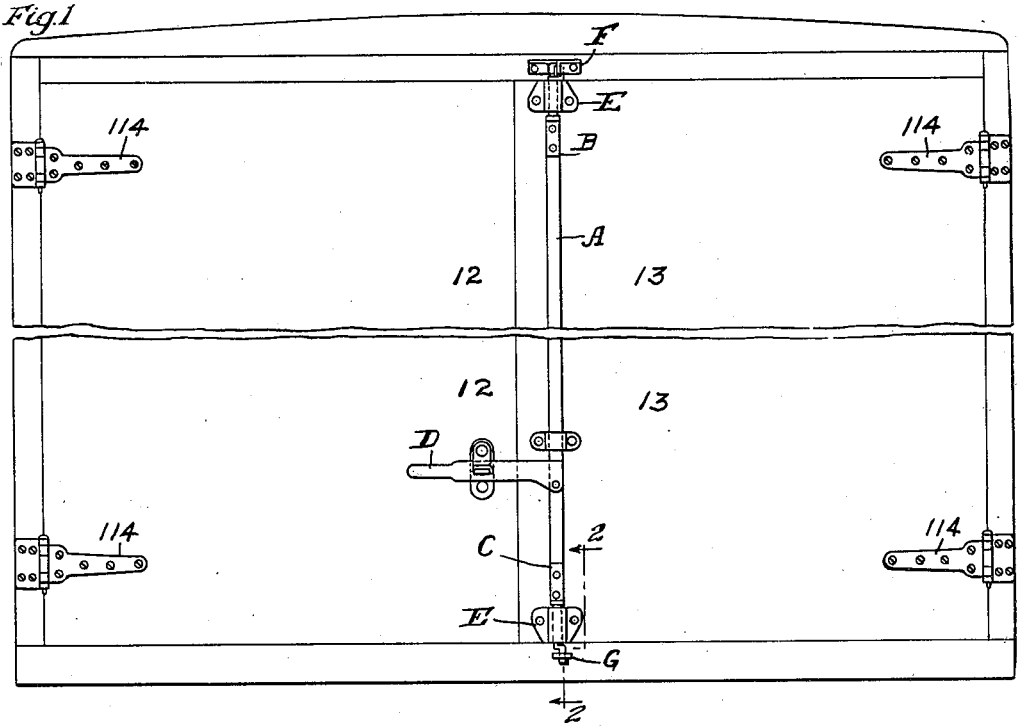
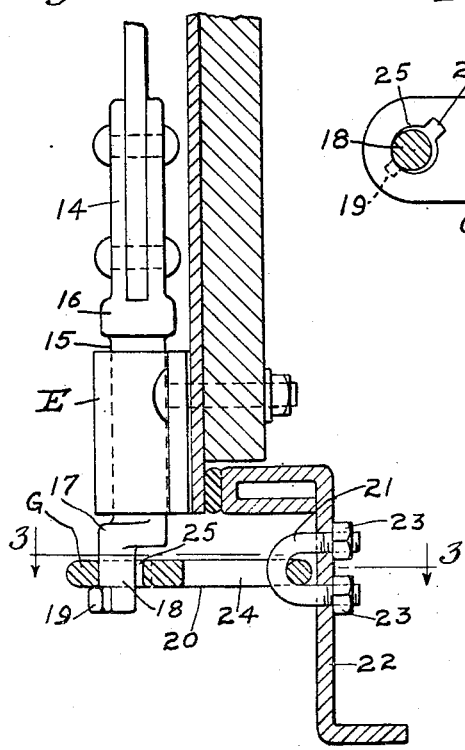
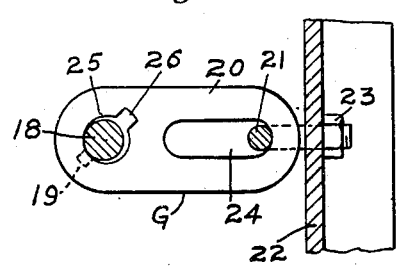
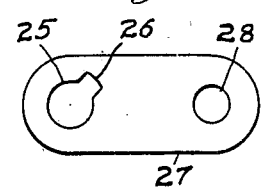
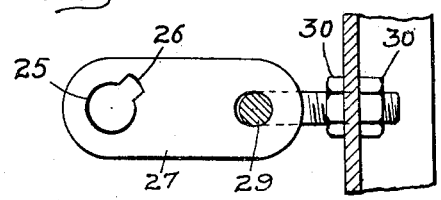
Inventor
Roland J. Olander
By Henry Fuchs
Atty Patented Nov. 15, 1949

2,488,026

UNITED STATES PATENT OFFICE 2,488,026

DOOR FASTENER

Roland J. Olander, Chicago, Ill., assignor to W. H. Miner, Inc., Chicago, Ill., a corporation of Delaware Application January 20, 1945, Serial No. 573,741

5 Claims. (Cl. 292—241)

This invention relates to improvements in door fasteners for hinged doors of automobile trucks.

One object of the invention is to provide a door fastener for automobile trucks comprising a rotary operating bar mounted on the truck door and having keeper engaging crank members adapted to cooperate with upper and lower keeper means mounted on the truck body, above and below the door, wherein the lower keeper means is in the form of a pivoted link adapted to be dropped to pendent out of the way position when the door has been opened so as to clear the usual loading platform, thereby protecting said lower keeper against damage which might otherwise occur when the truck is backed against the platform to receive or deliver the lading.

Other objects of the invention will more clearly appear from the description and claims hereinafter following.

In the drawing forming a part of this specification, Figure 1 is a rear elevational view of a portion of the body of an automobile truck provided with a door opening and a pair of hinged doors closing said opening, illustrating my improvements in connection therewith. Figure 2 is a vertical sectional view, lengthwise of the truck body, corresponding substantially to the line 2—2 of Figure 1, said view being on an enlarged scale. Figure 3 is a horizontal sectional view, corresponding substantially to the line 3—3 of Figure 2. Figure 4 is a view, similar to Figure 3, illustrating another embodiment of the invention. Figure 5 is a detail plan view of the keeper link or plate shown in Figure 4.

In said drawing, 10 indicates the rear wall of an automobile refrigerator truck having a door opening 11 therein, closed by a pair of hinged doors 12 and 13. Each door is provided with the usual hinges 114—114 along the vertical outer side edges thereof by which the door is swingingly supported.

As is common practice, the door member 12, which is that first closed, and the door member 13 have their meeting edges beveled and so inclined that the door 13 will maintain the door 12 in closed position and wedge the same shut when the door fastener is actuated to force the door 13 closed. The edges of the doors and the door frame are provided with the usual insulating packing material, not shown.

Referring first to the embodiment of the invention illustrated in Figures 1, 2, and 3, my improved door fastener mechanism comprises broadly a locking bar A; an upper keeper engaging end member B; a lower keeper engaging end member C; an operating lever D for rotating the bar; a pair of guide brackets E—E supporting the bar for rotation; an upper keeper F; and a lower keeper G.

The operating bar A is in the form of an elongated member of rectangular, transverse cross section and has the members B and C riveted thereto. The upper and lower members B and C are of similar design, except as hereinafter pointed out. Each end member has a forked portion 14 which embraces the flat bar A on opposite sides and has rivet members extending therethrough and through said bar. Outwardly of the forked portion 14, each end member has a cylindrical bearing portion or section 15, which is rotatably supported in the corresponding guide or bearing bracket E. The guide brackets E—E are of any well-known design and are secured to the door 13. Between the portions 14 and 15, each end member is enlarged, as indicated at 16, to provide an annular abutment shoulder adapted to limit endwise movement of the bar with respect to the corresponding bearing bracket. At the outer end thereof, outwardly of the bearing section 15, each of the end members is provided with a radially projecting crank arm 17 provided with the usual crank pin 18 at its outer end. The structure of the keeper engaging members thus far described is well known in this art, and the upper keeper engaging member B is of the type commonly employed in rotary bar door fasteners having keeper engaging crank members, the crank pin 18 thereof being in the form of a cylindrical projection or lug.

The crank pin 18 of the lower keeper engaging member C is provided with a radially, outwardly projecting retaining lug or finger 19 adapted to cooperate with the lower keeper G and to support the latter while the door 13 is being moved into and out of the door opening.

The upper keeper F is of the usual design, the same being provided with a cam slot within which the crank pin 18 of the upper keeper engaging member B is adapted to engage. The lower keeper G comprises a flat, platelike link 20, swiveled or hinged at its inner end to a supporting clevis 21 secured to the end sill 22 of the truck body by nuts 23—23. At the rear end portion thereof, the link 20 is provided with an elongated, longitudinally extending slot 24 which extends therethrough and within which the clevis is engaged. A circular opening or seat 25 is provided at the forward end portion of the link 20 and is adapted to receive the crank pin of the lower keeper engaging member C. The opening 25 extends entirely through the link and is of slightly greater diameter than the crank pin 18 and has a notch 26 radial thereof and communicating therewith, formed in the body of the link 20. As shown most clearly in Figure 2, the end sill 22 of the truck is inwardly offset with respect to the rear end of the truck, and the link member 20 of the keeper G, when in horizontal position, projects outwardly beyond the rear doors 12 and 13 of the truck. The connection between the link 20 and the clevis 21 provides for a certain amount of lost motion, that is, inward displacement of the link with respect to the clevis so that the link will abut the end sill 22 of the truck when the operating bar A is rotated contraclockwise or in direction to force the door open, thereby relieving the clevis from strain.

As will be evident, the link 20 of the keeper member G may be swung or dropped to pendent position against the end sill 22 of the truck where it will be out of the way underneath the projecting rear end of the truck body and thus protect it from damage when the truck is backed against a loading platform. The projecting supporting lug 19 of the crank pin 18 of the lower keeper engaging member C is so located that it will be in alignment with and pass freely through the notch 26 at the opening 25 of the link 20 when the door 13 is partly closed and in position to be cammed shut by the keeper engaging member of the operating bar. The link 20 of the keeper G is designed to be in its pendent position folded against the end sill 22 when the truck doors are open.

The operation of my improved door fastener as shown in Figures 1, 2, and 3 is as follows: When the doors are in closed position, locked by the door fastener, the hinge link 20 is in horizontal position, as clearly shown in Figure 2. In this position the crank pin 18 of the lower keeper engaging member C is engaged through the opening 25 of the link with the lug 19 engaged underneath the link in supporting relation thereto. While the parts are in this position, the operating bar A is rotated in contraclockwise direction, as viewed in Figure 3, to force the door open by camming engagement of the upper keeper engaging member B with the slot of the upper keeper F and by the crank connection of the lower keeper engaging member C with the link 20 which is forced against the sill 22 of the truck, the link 20 acting in the manner of a connecting rod. When the bar A has thus been rotated to a sufficient extent to have pried the door partly open, so that it may be swung completely open by hand, the lug 19 is in position to freely pass through the notch 26 and the link 20 is free to drop to the pendent out of the way position hereinbefore mentioned, there being sufficient play of the lower crank pin 18 in the opening 25 to permit the link to swing freely. In closing the door 13, the same is first swung to partly closed position, the operating bar at this time being in the position it assumed when the door was forced open, that is, with the crank pin 18 and lug 19 of the lower keeper engaging member C in position to enter the opening 25 and the notch 26 of the link 20. The operator then lifts the link 20 to horizontal position, thus engaging the lower crank pin 18 and the lug 19 thereof through the opening in the notch of said plate. While momentarily manually supporting the link 20 in horizontal position, the attendant rotates the bar A to such an extent in clockwise direction that the lug 19 is engaged underneath the link 20 to support the latter during the remainder of the operation of forcing the door shut.

Inasmuch as the lug 19 of the crank pin 18 acts to support the link 20 during the remainder of the door closing operation, the attendant releases his hold from the link 20, thus eliminating all danger of injury which might otherwise occur if he were compelled to manually support the link during the entire operation of forcing the door tightly closed.

Referring next to the embodiment of the invention illustrated in Figures 4 and 5, the construction is the same as that shown in Figures 1, 2, and 3, with the exception that the keeper link, which is indicated by 27, is held against endwise movement on its pivotal connection, that is, it is not displaceable inwardly of the sill 22 of the automobile truck. The link 27 is provided with a circular opening 28 at its inner end through which a clevis 29 is engaged, the said members or arms of the clevis being threaded to receive inner and outer nuts 30—30 adapted to engage the inner and outer sides of the end sill 22. As will be evident, the arrangement of inner and outer ends provides for lengthwise adjustment of the clevis, whereby the link may be adjusted to different cooperative positions with respect to the keeper engaging member C at the lower end of the operating bar A. The construction of the outer end of the link 27 is similar to the link 20 hereinbefore described, the same being provided with a circular opening and a notch identical with the opening 25 and the notch 26 of the link 20, and also indicated by 25 and 26, respectively. The keeper engaging end member C cooperates with the opening 25 and the notch 26 of the link 27 in a manner similar to that described in connection with the link 20 disclosed in Figures 1, 2, and 3.

As will be evident, in the operation of the device as shown in Figure 4, in forcing the door open, the pushing force is directly transmitted from the link to the clevis instead of being transmitted directly to the end sill of the truck as is the case in connection with the construction illustrated in Figures 1, 2, and 3, while in forcing the door closed the pulling force is transmitted in the same manner as in the embodiment of the invention first described, that is, directly from the link to the clevis.

I claim:

1. In a door fastener for a hinged door of an automobile truck, the combination with a vertically disposed, rotary operating bar mounted on the door, said bar being rotatable in reverse directions for forcing the door open and closed; of a radially projecting crank arm on the lower end of said bar; a depending crank pin on said arm at the outer end thereof; a normally horizontally disposed link; a clevis fixed to the truck, said link being pivotally connected at its inner end to said clevis for universal swinging movement from horizontal to pendent vertical position, said link having a journal opening for said crank pin at its outer end extending therethrough, within which the crank pin is rotatably engaged in said normal horizontal position of the link; and a radially projecting supporting lug at the lower end of said pin engageable underneath the link to support the latter in horizontal position while the door fastener is operated to force the door open or closed, said clevis holding the link against endwise displacement.

2. In a door fastener for a hinged door of an automobile truck having an end sill, the combination with a vertically disposed, rotary operating bar mounted on the door, said bar being rotatable in reverse directions for forcing the door open and closed; of a radially projecting crank arm on the lower end of said bar; a depending crank pin at the outer end of said arm; a normally horizontally disposed link below said door; and a clevis fixed to said end sill, said link being swingable on said clevis in a horizontal plane, and having a lost motion connection with said clevis at the inner end of the link, whereby the link is displaceable inwardly toward said sill to be buttressed against the latter, said clevis supporting said link when an outwardly acting force is applied to the link, said link having a journal opening at the front end thereof for said crank pin and within which said crank pin is rotatably engaged when said link is in its horizontal position.

3. In a door fastener for a hinged door of an automobile truck, the combination with a vertically disposed, rotary operating bar mounted on the door; of a keeper engaging crank arm at the lower end of said bar; a keeper engaging crank pin at the outer end of said arm; a keeper below the door with which said crank pin is engageable, said keeper having a journal opening therethrough within which said crank pin is engageable; and means for supporting said keeper for swinging movement to and from horizontal position, said crank pin having a radial lug at its lower end engageable beneath said keeper to support the same in horizontal position, said journal opening of the keeper being laterally enlarged at one side to provide clearance for said lug to pass through said journal opening when the crank arm is in a predetermined position to free said link to permit the same to drop to pendent out of the way position.

4. In a fastener for a hinged door of an automobile truck, the combination with a vertically disposed, rotary operating bar mounted on the door; of a radially extending, horizontal keeper engaging crank arm at the lower end of said bar; a depending, vertically disposed crank pin at the outer end of said arm; a keeper below the door with which said crank arm cooperates when engaged therewith to force the door open and closed as said bar is rotated in reverse directions, said keeper, at the outer end thereof, having a circular journal opening therethrough to receive the crank pin; and means at the inner end of said keeper for supporting the same on said truck for swinging movement in both vertical and horizontal planes and holding said keeper against endwise inward and outward movements when the crank arm is rotated in door opening and closing directions, respectively, said keeper being swingable from pendent position upwardly in said vertical plane to horizontal position to operatively engage the crank pin in said journal opening, and swingable downwardly to disengage the same from said crank pin and drop to pendent out of the way position below said door.

5. In a door fastener for a hinged door of an automobile truck, the combination with a vertically disposed rotary operating bar mounted on the door, said bar being rotatable in one direction for forcing the door closed; of a crank member on the lower end of said bar, said crank member including a depending, vertically disposed crank pin; a link member which is horizontally disposed when in operative position, said link member being located below the door and having a journal opening therethrough for said crank pin; and means for connecting said link to the truck, comprising a clevis fixed to said truck on which the inner end of said link is pivotally supported for swinging movement in both horizontal and vertical planes, said clevis holding said link against endwise outward movement, said link being swingable downwardly from horizontal position to pendent vertical position below the door and upwardly from pendent position to said horizontal position, said link, when swung to said horizontal position, being operatively engaged with said crank pin with the pin extending through said journal opening, said crank pin having a radial retaining lug at its lower end engageable underneath said link member to support the latter in said horizontal position while the door fastener is operated to force the door closed.

ROLAND J. OLANDER.

REFERENCES CITED

The following references are of record in the file of this patent:

UNITED STATES PATENTS

| Number | Name | Date |
|---|---|---|
| 791,688 | Gill | June 6, 1905 |
| 1,483,923 | Arnold | Feb. 19, 1924 |
| 1,653,487 | White | Dec. 20, 1927 |
| 1,952,112 | Bartsch | Mar. 27, 1934 |
| 2,260,519 | Haseltine | Oct. 28, 1941 |
| 2,301,444 | Olander | Nov. 10, 1942 |

FOREIGN PATENTS

| Number | Country | Date |
|---|---|---|
| 77,088 | Switzerland | Nov. 12, 1917 |